United States Patent
Nicosia et al.

(10) Patent No.: US 10,913,903 B2
(45) Date of Patent: Feb. 9, 2021

(54) SYSTEM AND METHOD FOR USING A FLASH EVAPORATOR TO SEPARATE BITUMEN AND HYDROCARBON CONDENSATE

(71) Applicant: Vivakor, Inc., Las Vegas, NV (US)

(72) Inventors: Matt Nicosia, Riverton, UT (US); William Ison, Irvine, CA (US)

(73) Assignee: Vivakor, Inc., Las Vegas, NV (US)

( * ) Notice: Subject to any disclaimer, the term of this patent is extended or adjusted under 35 U.S.C. 154(b) by 0 days.

(21) Appl. No.: 16/554,158

(22) Filed: Aug. 28, 2019

(65) Prior Publication Data

US 2020/0071621 A1   Mar. 5, 2020

Related U.S. Application Data

(60) Provisional application No. 62/723,608, filed on Aug. 28, 2018.

(51) Int. Cl.
| | |
|---|---|
| *C10G 7/08* | (2006.01) |
| *C10G 7/12* | (2006.01) |
| *C10G 9/06* | (2006.01) |
| *B01D 5/00* | (2006.01) |
| *B01D 3/06* | (2006.01) |

(52) U.S. Cl.
CPC ............. *C10G 7/08* (2013.01); *B01D 3/06* (2013.01); *B01D 5/006* (2013.01); *C10G 7/12* (2013.01); *C10G 9/06* (2013.01); *C10G 2300/308* (2013.01); *C10G 2300/4012* (2013.01)

(58) Field of Classification Search
CPC ... C10G 7/08; C10G 7/12; C10G 9/06; C10G 2300/4012; C10G 2300/308; B01D 5/006; B01D 3/06; B01D 1/0017; B01D 1/20; B01D 1/16; B01D 1/0082; B01D 3/42
See application file for complete search history.

(56) References Cited

U.S. PATENT DOCUMENTS

| | | | |
|---|---|---|---|
| 4,069,137 A | * | 1/1978 | Greenwood ........... C10G 35/12 208/65 |
| 4,216,592 A | | 12/1980 | Koch |
| 4,642,992 A | | 2/1987 | Julovich |
| 4,837,423 A | | 6/1989 | Peterson et al. |
| 5,927,970 A | | 7/1999 | Pate et al. |
| 6,112,675 A | | 9/2000 | Potter et al. |

(Continued)

FOREIGN PATENT DOCUMENTS

| | | |
|---|---|---|
| WO | 2006/096833 A2 | 9/2006 |
| WO | 2018/102831 A1 | 6/2018 |
| WO | WO2019089831 | 5/2019 |

*Primary Examiner* — Randy Boyer
*Assistant Examiner* — Juan C Valencia
(74) *Attorney, Agent, or Firm* — Kirton McConkie; Brian Tucker (57) ABSTRACT

A system and method for separating bitumen and condensate extracted from separating bitumen from oil sands material is disclosed. The method includes passing the mixture of bitumen and condensate through a flash evaporator to separate them. In the flash evaporator the mixture is heated at high pressure after which it is sprayed into a tank where the pressure is much lower, allowing the condensate to vaporize and the bitumen to settle to the bottom of the tank. The vapors are then passed through a condenser unit, causing them to cool and liquefy.

24 Claims, 4 Drawing Sheets

(56) References Cited

U.S. PATENT DOCUMENTS

| | | |
|---|---|---|
| 6,247,919 B1 | 6/2001 | Welz, Jr. et al. |
| 6,293,121 B1 | 9/2001 | Labrador |
| 7,282,167 B2 | 10/2007 | Carpenter |
| 9,272,920 B2 | 3/2016 | Carpenter et al. |
| 9,321,967 B2 | 4/2016 | Filby et al. |
| 9,884,997 B2 | 2/2018 | Podlipskiy |
| 2005/0188923 A1 | 9/2005 | Cook et al. |
| 2005/0252833 A1 | 11/2005 | Doyle et al. |
| 2006/0144080 A1 | 7/2006 | Heath et al. |
| 2008/0277318 A1 | 11/2008 | Bozak et al. |
| 2009/0020232 A1 | 1/2009 | Wolfe et al. |
| 2010/0126727 A1 | 5/2010 | Vinegar et al. |
| 2010/0236991 A1* | 9/2010 | Hastings ............... B03B 9/02 208/390 |
| 2010/0243521 A1* | 9/2010 | Peters ................. C10G 69/08 208/63 |
| 2011/0011720 A1 | 1/2011 | Rinker |
| 2011/0127198 A1 | 6/2011 | Siy et al. |
| 2012/0152809 A1 | 6/2012 | Kift et al. |
| 2013/0256092 A1 | 10/2013 | Podlipskiy |
| 2014/0083911 A1* | 3/2014 | Van Der Merwe .... C10G 1/042 208/390 |
| 2015/0013413 A1 | 1/2015 | Kimura et al. |
| 2015/0368567 A1 | 12/2015 | Wheeler |
| 2016/0033170 A1 | 2/2016 | Urbanski |
| 2016/0348010 A1* | 12/2016 | Bulbuc ................. C10G 1/045 |
| 2017/0025297 A1 | 1/2017 | Kudo et al. |
| 2017/0167751 A1 | 6/2017 | Frechette et al. |
| 2018/0346819 A1 | 12/2018 | Nicosia et al. |
| 2019/0194547 A1 | 6/2019 | Nicosia |

* cited by examiner

SYSTEM AND METHOD FOR USING A FLASH EVAPORATOR TO SEPARATE BITUMEN AND HYDROCARBON CONDENSATE

CROSS-REFERENCE TO RELATED APPLICATIONS

This application claims the benefit of U.S. Provisional Application No. 62/723,608, filed Aug. 28, 2018, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH OR DEVELOPMENT

Not Applicable.

BACKGROUND

1. The Field of the Present Disclosure

This disclosure is particularly directed towards a method of processing bitumen Specifically, this invention is directed towards a system and method for separating bitumen and other hydrocarbons extracted from oil sands material.

2. Description of the Related Art

About an eighth of total world petroleum reserves is in the form of tar sands. Tar sands (also referred to as oil sands) are a combination of clay, sand, water, and bitumen—a sticky, black and highly-viscous or semi-solid form of petroleum that is also known as asphalt. All such reserves, as well as others, have a need for improved recovery.

Hydrocarbons are classified by API gravity. This is a measure of how heavy or light a hydrocarbon liquid is. API gravity is the specific gravity of a hydrocarbon liquid. Extra heavy oil and Bitumen have an API gravity of less than 10, (API<10), while various grades of crude oil have higher specific gravity, with "light" crude oil having an API gravity approximately higher than 30. Higher API gravity oils are more valuable, because more crude oil can be extracted from a given amount of product. Therefore, in extracting oil from tar sands, it is desirable to produce product with higher API gravity.

Currently, oil is not produced from tar sands on a significant commercial level in the United States; In fact, only Canada has a large-scale commercial tar sands industry, though a small amount of oil from tar sands is produced commercially in Venezuela. The Canadian tar sands industry in Alberta produces more than one million barrels of synthetic oil per day. Currently, tar sands represent about forty percent of Canada's oil production, and output is expanding rapidly. Approximately twenty percent of U.S. crude oil and products come from Canada, and a substantial portion of this amount comes from tar sands.

The bitumen in tar sands cannot be pumped from the ground in its natural state; Instead tar sand deposits are mined, usually using strip mining or open pit techniques, or the oil is extracted by underground heating with additional upgrading. Although after processing, the oil from tar sands is similar to oil pumped from conventional oil wells, extraction of oil from tar sands is much more complex than conventional oil recovery. Oil sands recovery processes include extraction and separation systems to separate the bitumen from the clay, sand, and water that make up the tar sands. This results in bitumen, which has a very low API gravity, and is extremely thick. Bitumen requires additional upgrading before it can be refined. Because it is so viscous (thick), it also requires dilution with lighter hydrocarbons to make it transportable by pipelines.

There are two different types of tar sands: "oil-wetted" tar sands and "water-wetted" tar sands. The Canadian tar sands that have been successfully exploited are water-wetted tar sands. They have water contents typically in the 3-5% range. Oil wetted tar sands have the bitumen trapped within the pore spaces of the host sandstone, adhering directly to the sand grains without the presence of an intervening film of water (known as connate water).

Currently, the Clark process is utilized in Canada to extract the bitumen from water-wetted tar sands. After mining, these tar sands are transported to an extraction plant, where a hot water process separates the bitumen from sand, water, and minerals. The separation takes place in separation cells. Hot water is added to the sand, and the resulting slurry is piped to the extraction plant where it is agitated. The combination of hot water and agitation releases bitumen from the oil sand, and causes tiny air bubbles to attach to the bitumen droplets, that float to the top of the separation vessel, where the bitumen can be skimmed off. Further processing removes residual water and solids. The bitumen is then transported and eventually upgraded into synthetic crude oil.

Processes other than the Clark process can be used to extract bitumen from water-wetted tar sands which are buried too deep for economical mining operations. This includes using in-situ production methods such as steam injection, solvent injection, and firefloods, in which oxygen is injected and part of the resource burned to provide heat. To date, steam injection is the favored method. Some of these methods require large amounts of both water and energy.

Variants of the Clark process have also been tried in extracting bitumen from oil-wetted tar sands. However, as oil-wetted tar sands lack connate water, these attempts have met with failure or limited success due to the Clark process's reliance on connate water.

One method of extracting bitumen from oil-wetted tar sands, or extracting oil from oil saturated materials, involves mixing the oil wetted material with a hydrocarbon condensate or solvent in a mix tank with an agitator. This results in a slurry of oil sands material and condensate, which passes through a centrifuge, creating a mixture of bitumen and condensate, as well as clean sand or whatever material was originally saturated with oil. However, the method results in a mixture of bitumen or heavy oil with components of lighter condensate. The mixture has a relatively low API gravity bitumen or heavy oil mixed with higher API components. If the two were separated, the higher API condensate could be reused as condensate in the system or in a variety of applications, while the bitumen could be recycled as asphalt binder. In order to do so, however, the bitumen must have less than 1% of the hydrocarbon material.

In view of the above, it would be desirable to separate such higher API components from the bitumen and/or heavy oil, or crack them, so they can be used in a variety of applications, such as crude oil, or recycled as condensate for future use.

BRIEF DESCRIPTION OF THE DRAWINGS

Reference will now be made to the accompanying drawings, wherein.

It will be understood that all representations provided in the figures are representative and not limiting.

DETAILED DESCRIPTION

For the purposes of promoting an understanding of the principles in accordance with the disclosure, reference will now be made to the embodiments described herein with reference to the figure, and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure and the subject matter claimed.

Before the present system and method is disclosed and described, it is to be understood that this disclosure is not limited to the particular configurations, process steps, and materials disclosed herein as such configurations, process steps, and materials may vary somewhat. The current disclosure describes specific amounts, however, it is to be understood that the current invention is not limited to processing specific amounts of material: routine upscaling or downscaling of the described process is considered to be within the disclosure. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, un-recited elements or method steps.

The instant disclosure utilizes a mixture of bitumen and higher API hydrocarbons and crack out a final product with a high API gravity (approximately greater than 50 API) from the bitumen components. In one exemplary embodiment, the mixture that is processed consists of hydrocarbon materials obtained from a process of extracting bitumen from oil sands material, but the processed mixture can consist of any mixture of higher API hydrocarbons with a bitumen or lower API component.

The instant disclosure is also directed towards a flash evaporator designed to both, by way of example and not limitation, recycle up to 200 barrels of condensate per day and also designed to crack out any materials within the resulting bitumen which have an API greater than about 50, creating approximately 130 barrels per day of new hydrocarbon condensate which can be used for a number of purposes, including for example, for use in a process for extracting bitumen from oil sands material, or for use in a number of other applications, such further refining for sale. While specific amounts are given, it is to be understood that the current process could be routinely upscaled or downscaled to process greater or lesser amounts of material. The method described results in low API heavy oil or bitumen as well as a hydrocarbon condensate with greater than 50 API.

In addition to the major components described, a number of sensors and transmitters can be included. These sensors and transmitters serve the purpose of monitoring the variables involved in the process, including but not limited to pressure and temperature, and informing the user when the variables are "high" or "low" for the process. In one embodiment the sensors are connected to a controller which automatically monitors and controls the variables.

Figure 1:
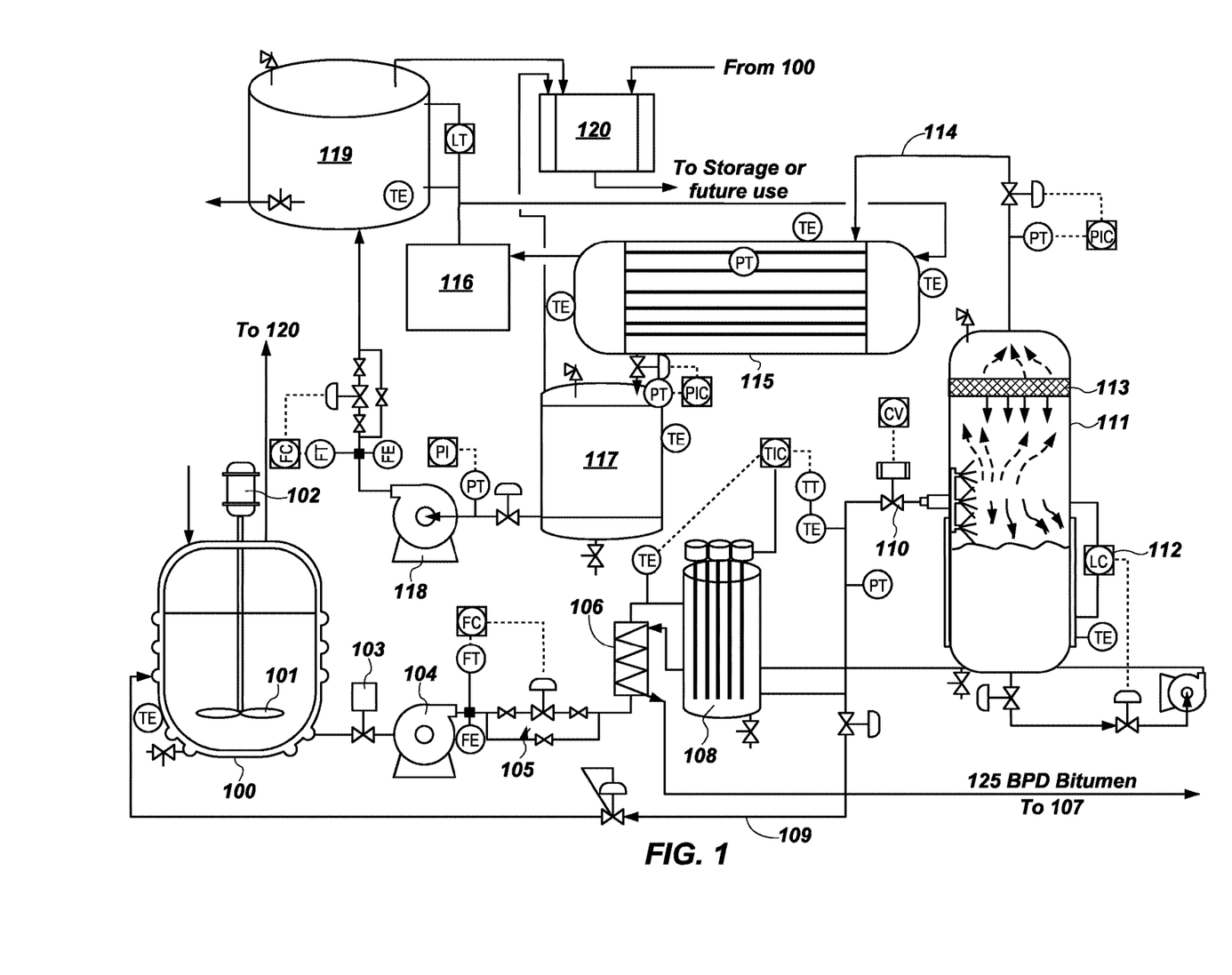
FIG. 1 is a diagrammatic view of the system and method for a flash evaporator to separate bitumen and hydrocarbon condensate.

One embodiment of the invention is a system for separating Bitumen and lower API hydrocarbon condensate. A block diagram of the entire system is shown in FIG. 1. The system comprises a batch tank 100 which holds a mixture of bitumen and hydrocarbon condensate. The source of this mixture can be, for example, a process of removing bitumen from oil sands material. In one embodiment of the invention the mixture enters into the batch tank through a valve 201 at between approximately 130 and 200 degrees Fahrenheit. The batch tank also includes a method for keeping the mixture agitated so it is always moving. In the preferred embodiment, the method for keeping the mixture agitated is a propeller agitator 101 powered by a 5 horse-power motor 102 which spins the agitator at approximately 20 RPM. However, any device which can keep the mixture of bitumen and condensate in constant motion can be used.

In one embodiment the batch tank 100 has a volume of approximately 700 barrels, but in other embodiments the volume may be larger or smaller. In one embodiment, the bitumen condensate batch tank contains bitumen and condensate at approximately 130-200 degrees Fahrenheit. In another embodiment, the batch tank contains bitumen and condensate at approximately 150 degrees Fahrenheit.

Figure 2:
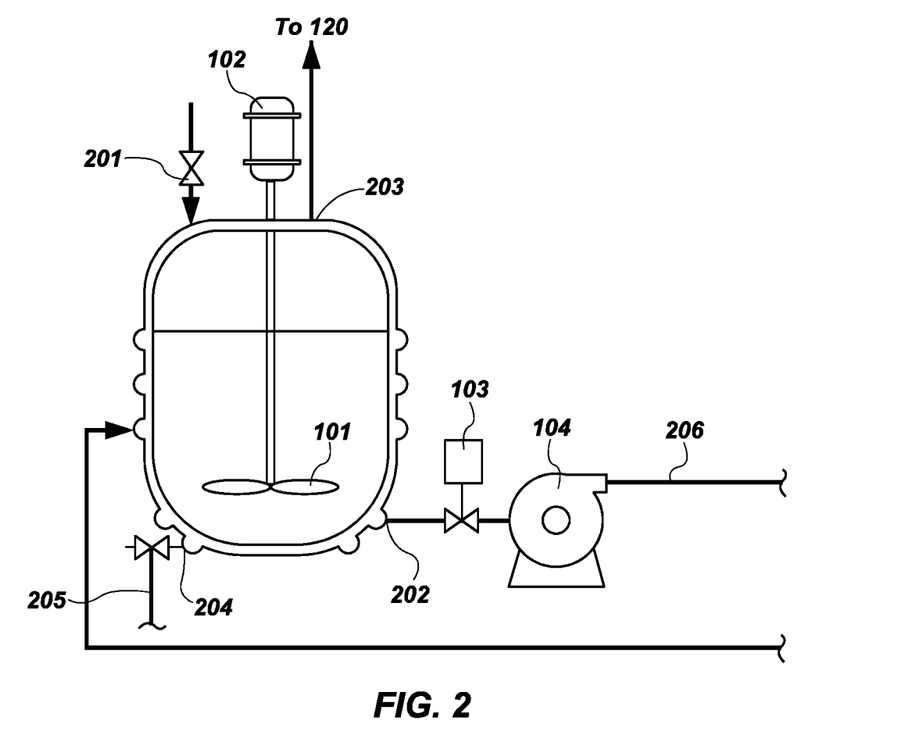
FIG. 2 is a diagram of a Batch tank and related components for the flash evaporator.

The batch tank has an opening at the bottom 202 controlled by an automatic open/close valve 104 and a pump 103 which allows the mixture to be removed from the tank. In one embodiment this pump is capable of removing the mixture from the batch tank at the rate of between about 10 and about 50 gallons per minute, with a pressure of between 145-160 PSI. In another embodiment the pump removes the pressure at a rate of approximately 26 gallons per minute at approximately 150 PSI. The batch tank can also incorporate a connection 203 to tubes or pipes which lead to a condenser unit allowing vapors to be collected from the batch tank. In one embodiment the batch tank also has a connection 204 to the warm up and recycle line 205, which allows the mixture to be pumped back into the batch tank after passing through an oil heater 108. The location of this connection can be near the bottom of the tank in some embodiments, or near the top of the tank in order to more easily allow the mixture to be pumped back into the tank.

Figure 3:
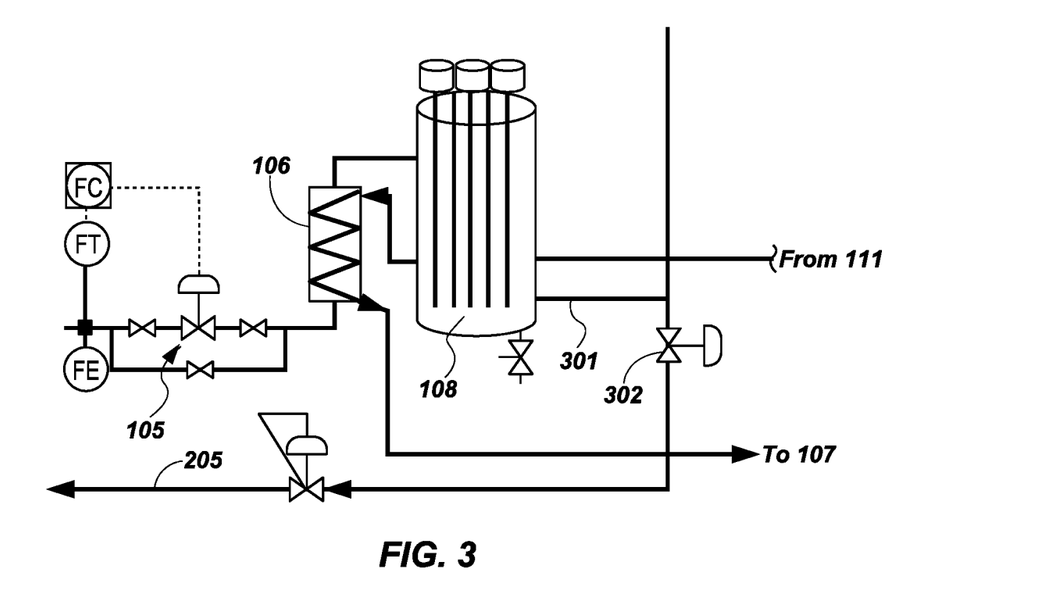
FIG. 3 is a diagram of the oil heater component of a flash evaporator, also showing also showing the related components.

The pump 103 is connected by piping or tubes 206 to an oil heater 108. FIG. 3. In one embodiment there are a variety of sensors and flow regulators in the piping or tubes between the pump and the oil heater 105. These allow the pressure and flow to be detected and regulated, so that the pressure can be maintained at approximately 150 PSI. In another embodiment, a pre-heat exchanger 106 is connected to the pipes or tubing between the batch tank and the oil heater. This allows the heat from the mixture to be used for other purposes. In one embodiment, the heat can be used to heat the bitumen or heavy oil which is extracted later in the process, keeping it from getting too cool and hardening. In this embodiment pipes from a flash distillation drum 111, connect to the pre-heat exchanger 106 and to a bitumen storage tank 107.

The oil heater 108 which the pump is connected to is in one embodiment an inline electric heater capable of heating the bitumen/condensate mixture to 460-500 degrees Fahrenheit. The oil heater 108 is connected to another pipe or more tubing 301 which connects to a flash distillation drum 111. In one embodiment, the oil heater is connected to the batch tank not only through the regular line, but also through a warm up and recycle line 205. This line allows the mixture to be returned to the batch tank once it is heated so that it can be sent through the oil heater multiple times if necessary to get the mixture to the required temperature. This embodiment of the invention would also include a valve 302 which regulates where the mixture goes. This allows the mixture to be returned to the batch tank and passed through the oil heater again if it does not attain the necessary temperature the first time through the oil heater, or to be held until the flash distillation drum can be used. Or the mixture can be passed into the flash distillation drum if it has reached the necessary temperature.

Figure 4:
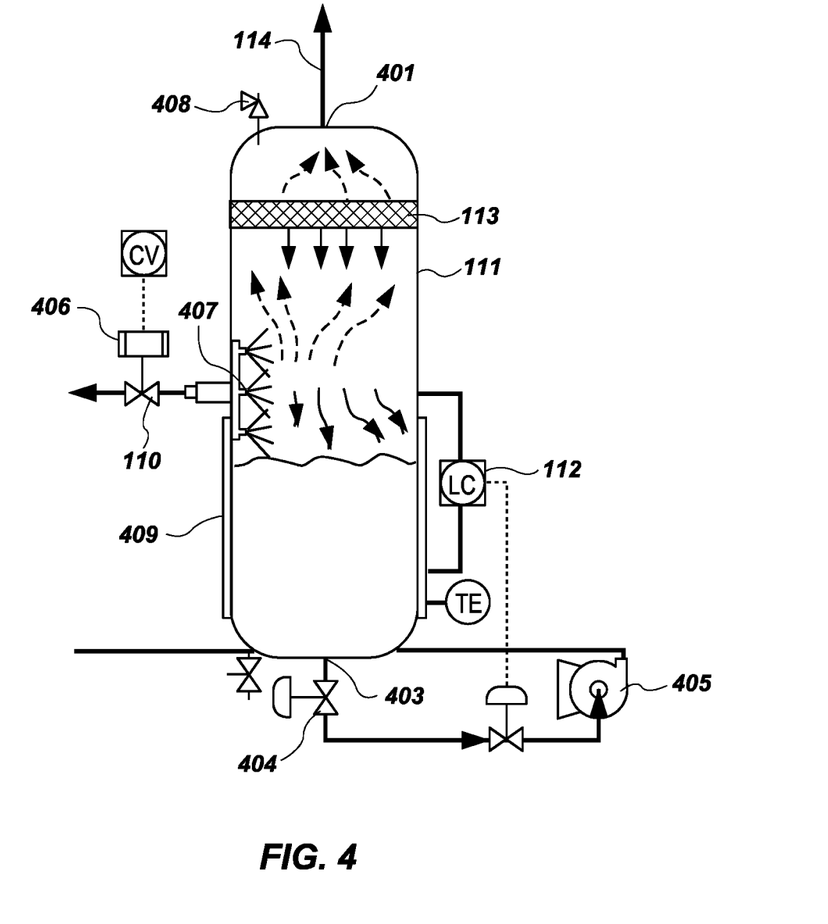
FIG. 4 is a diagram of the flash distillation drum of a flash evaporator, aslo showing the related components for a flash evaporator; and, FIG. 5 is a diagram of the condenser and chiller units of a flash evaporator along with storage tanks and other related components for a flash evaporator.

FIG. 4 shows one embodiment of the flash distillation drum 111. In this embodiment, the flash distillation drum, 111, is a cylindrical tank with a capacity of approximately 3000 gallons, which is attached to the pipes or tubes coming from the oil heater via a throttle valve 110. In another embodiment the flash distillation drum can process approximately 642 gallons of oil. The flash distillation drum has an opening at the top 401 connected to further tubing 402 where vapors can be pumped to the condenser unit. Near the bottom of the drum there is an connection 403 controlled by a valve 404 and a pump 405 wherein heavy oil with a low API can be removed from the flash distillation drum 111. In one embodiment the oil removed has an API of 10-12. The throttle valve 110 is powered by a motor 406 and can incorporate a nozzle or series of nozzles 407 which spray the condensate/bitumen mixture into the flash distillation drum in jets or cones. The throttle valve 110 is designed to drop the pressure from approximately 150 PSI to approximately 20 PSI. The throttle valve is a motor-powered valve designed to allow the pressure to drop across it as the mixture is sprayed through the valve. The throttle valve sprays the condensate from the heater into the flash distillation drum in jets or cones. When the mixture is passes through the throttle valve 110, the drop in pressure allows the high API gravity materials to vaporize in the flash distillation drum 111. The vapors are then vented through the tubing 114 at the top of the flash distillation drum 111, to be transferred to the condenser unit, 115. In one embodiment, the materials vaporized have an API gravity higher than approximately 50.

In one embodiment, the valve at bottom of the flash distillation drum 403 connects to a tube which passes through the pre-heat exchanger 106 (See FIG. 2) which uses heat from the mixture leaving the batch tank to accomplish the pre-heating. In one embodiment the flash distillation drum is connected to the bitumen holding tank 107, which in one embodiment is a 200 barrel holding tank. In another embodiment the flash distillation drum is equipped with a heater 409 which can be used to ensure that bitumen does not harden inside the drum when it is not in use. The heater 409 is a heat trace at approximately 200 degrees Fahrenheit. In another embodiment, there is a level controller and level control valve, 112, in the flash distillation drum, which detects the level of material in the flash distillation drum and maintains the level of material in the drum at all times to be at approximately 10%-48% full.

In another embodiment the level is maintained at approximately 30-35% full. In another embodiment the level is maintained at approximately 40% full. In addition, in one embodiment there is a filter, 113, made of a mesh substance located on the top of the flash distillation drum, which ensures that only vapors exit the top of the vessel and no bitumen droplets enter the vapor stream and condenser. The flash distillation drum can also incorporate a pressure relief valve 408 at the top.

Figure 5:
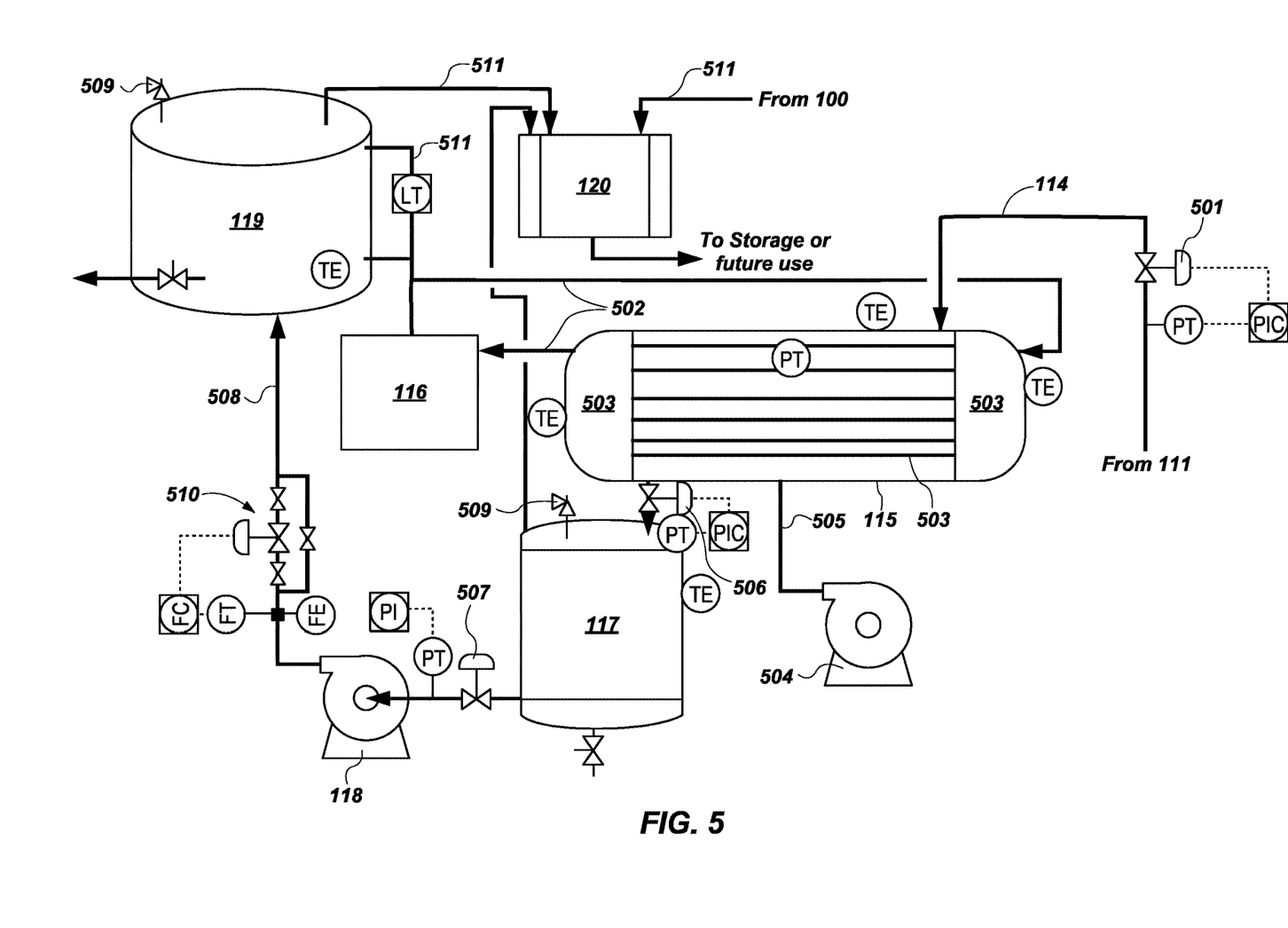

FIG. 5 shows a condenser unit, 115, which is connected to the top of the flash distillation drum, 111, via tubing, 114, which receives vapors from the flash distillation drum, 111. A valve 501 can control the flow of vapor to the condenser unit 115. The condenser unit, 115, cools the vapors from the flash distillation drum and allows them to condense to create clean condensate to be store in the finished condensate tank, 119, for future use or sale. In one embodiment the condenser unit is a shell and tube condenser, consisting of a shell surrounded by a series of tubes through which coolant is pumped. In a further embodiment, the condenser unit has a shell rated at 50 PSI and is capable of processing approximately 50 gallons per minute of condensate. In a further embodiment the pressure in the condenser is approximately 10 PSI. In one embodiment the temperature within the condenser is between approximately 200 degrees Fahrenheit and 400 degrees Fahrenheit. In another embodiment the temperature in the condenser is approximately 350 degrees Fahrenheit.

The condenser is connected to a chiller 116 which processes coolant. In one embodiment, the chiller, 116, is an 80-ton chiller which cools the coolant to approximately 32 degrees Fahrenheit. The chiller is connected to the condenser via tubes 502 that also pass around the outside of the shell of the condenser 503. Coolant then passes through these tubes on the condenser, 503. In one embodiment the condenser is also connected to a vacuum pump 504 via tubing 505 which can pull vapors from the flash distillation drum into the condenser unit.

The condenser is connected to a collection tank 117, which in one embodiment is a 100 barrel collection tank. In one embodiment, the temperature of the collection tank is between 80 and 150 degrees Fahrenheit with a pressure at 5-18 PSI. In another embodiment the temperature in the collection tank is 130 degrees Fahrenheit and the pressure is 10 PSI. In one embodiment the collection tank is located underneath the condenser and thus is gravity-fed through a tube with a valve 506. The collection tank is also connected to a finished condensate tank 119 via a valve 507 and a series of pipes or tubes 508 and a pump 118, which allows the condensate collected in the collection tank to be pumped into the finished condensate tank. In one embodiment the pump, 118 can move between approximately 5 and approximately 40 gallons per minute of condensate, and in another embodiment moves approximately 25 gallons per minute. In one embodiment there are also sensors and flow regulators 510 in the pipes or tubes between the collection tank 117 and the storage tank 119. The finished condensate tank, 119, can store the product for sale or future use. The finished condensate tank 119 and the collection tank 117 also incorporate pressure relief valves 509. One possible use for this condensate could be in a mix tank for a process of extracting bitumen from oil sands material. In one embodiment the finished condensate tank, 119, has a capacity of approximately 400 barrels, in another embodiment the capacity is approximately 350 barrels, but other capacities can be used, as will be appreciated by those skilled in the art.

In one embodiment, the condensate tank, the collection tank, and the batch tank have a series of tubes 511 exiting the top of each one which connect to a second condenser unit 120. These tubes can collect vapors from throughout the process and collect additional condensate for use in another process as condensate or to be added to the final product.

Another embodiment of the invention is a process to separate bitumen from higher API condensate. In this process, shown in FIG. 1, a mixture of bitumen and hydrocarbon condensate is fed into a bitumen condensate batch tank, 100, which is equipped with an agitator, 101. The agitator keeps the mixture in constant motion, not allowing it to settle. In one embodiment the batch tank has a volume of approximately 700 barrels, but in other embodiments the volume may be larger or smaller. In one embodiment, the bitumen condensate batch tank contains bitumen and condensate at approximately 130-200 degrees Fahrenheit. In another embodiment, the batch tank contains bitumen and condensate at approximately 150 degrees Fahrenheit. In a further embodiment the agitator is powered by a 5 horsepower motor which spins the agitator at approximately 20 RPM, 102. The condensate mixed with bitumen is stored within the batch tank and kept in motion by the agitator.

The mixture remains in the batch tank, 100, until it is pumped out by the bitumen/condensate pump, 104. In one embodiment the mixture is kept in the tank and allowed to pass through the pump by an automatic open/close valve, 103. This valve controls the flow of the condensate through the pump, 104, so that proper quantities of mixture can go through the process without overwhelming the device. In one embodiment, the mixture is pumped out at a rate of between about 10 and about 50 gallons per minute. In another embodiment the mixture is pumped at approximately 26 gallons per minute. In one embodiment the mixture can be pumped at approximately 145-160 PSI. In another embodiment the mixture is pumped at approximately 150 PSI.

The mixture is pumped out of the batch tank, 100, by the bitumen condensate pump, 104 after passing through the automatic open/close valve, 103. In one embodiment, the mixture then passes through a series of pressure and flow instrumentation elements, 105, including a flow element and flow transmitter, which, along with the pump, build the pressure in the mixture and measure that pressure. In one embodiment the pressure builds to approximately 145-160 PSI. In another embodiment the pressure builds to approximately 150 PSI. In one embodiment the mixture then passes through a pre heat exchanger, 106, wherein the excess heat from the mixture in the batch tank is used to preheat the bitumen which is a later product of the process, before said bitumen is pumped to a storage tank, 107, which in one embodiment has about a 200 barrel capacity.

After passing through the preheater, 106, the mixture passes through an inline electric heater, 108, where it is heated to approximately 460-500 degrees Fahrenheit while the pressure is maintained. In one embodiment the mixture is heated to approximately 486 degrees Fahrenheit. In one embodiment the condensate can be pumped from the electric heater back to the batch tank in order to continuously warm up the condensate and recycle it via the warm up & recycle line, 109. If needed, the mixture can be passed through the electric heater multiple times until it is heated to the proper temperature.

After being heated in the oil heater to approximately 486 degrees Fahrenheit, the mixture of bitumen and condensate is fed into the flash distillation drum, 111, where the condensate is separated from the bitumen to make two products. In an embodiment, the pressure of about 150 PSI is maintained until the mixture is forced into the flash distillation drum. The mixture is forced into the flash distillation drum via a 0-100% throttle valve designed to drop the pressure from approximately 150 PSI to approximately 20 PSI, 110. The throttle valve is a motor-powered valve designed to allow the pressure to drop across it as the mixture is sprayed through the valve. The throttle valve sprays the condensate from the heater into the flash distillation drum in jets or cones. In one embodiment the pressure in the flash distillation drum is between approximately 10 and 20 PSI. In another embodiment the pressure is maintained at approximately 15 PSI. As noted above, as it is sprayed into the drum, the pressure in the mixture drops between approximately 125 PSI and 150 PSI instantaneously. In one embodiment the flash distillation drum, 111, is a cylindrical tank with a capacity of approximately 3000 gallons. When the mixture is pumped through the nozzle, the drop in pressure allows the high API gravity materials to vaporize. The vapors are then vented off the top of the flash distillation drum, to be transferred to the condenser unit, 115. In one embodiment, the materials vaporized have an API gravity higher than approximately 50.

The heavy oil and bitumen remaining in the tank, after the higher API condensate is vaporized, settle to the bottom of the drum and in one embodiment are transferred to a holding tank. In one embodiment, as the bitumen and heavy oil pass out of the flash distillation drum they are pre-heated by the pre heat exchanger, 106, which uses heat from the mixture leaving the batch tank to accomplish the pre-heating. In one embodiment the bitumen is transferred to a 200 barrel holding tank, 107, for storage, future use, sale, or further processing. When the flash distillation drum is not in use, the bottom is heated to ensure that the bitumen does not harden up inside the drum. In one embodiment, there is a level controller and a level control valve, 112, in the flash distillation drum which maintain the level of material in the drum at all times to be at approximately 10%-48% full. In another embodiment the level is maintained at approximately 30-35% full. In another embodiment the level is maintained at approximately 40% full. In addition, there is a filter, 113, on the top of the drum, which ensures that only vapors exit the top of the vessel and no bitumen droplets enter the vapor stream and condenser. This filter can be made from a mesh substance. The flash distillation drum is designed to crack off any light gasses within the bitumen over 50 API.

The condenser unit, 115, is attached to the top of the flash distillation drum, 111, via tubing, 114, which receives vapors from the flash distillation drum, 111. The condenser unit, 115, cools the vapors from the flash distillation drum and allows them to condense to create clean condensate to be store in the finished condensate tank, 119, for future use or sale. In one embodiment the condenser unit is a shell and tube condenser, consisting of a shell surrounded by a series of tubes through which coolant is pumped. In a further embodiment, the condenser unit has a shell rated at 50 PSI and processes approximately 50 gallons per minute of condensate. In a further embodiment the pressure in the condenser is approximately 10 PSI. In one embodiment the temperature within the condenser is between approximately 200 degrees Fahrenheit and 400 degrees Fahrenheit. In another embodiment the temperature in the condenser is approximately 350 degrees Fahrenheit.

The coolant is cooled by a chiller, 116. In one embodiment, the chiller, 116, is an 80-ton chiller which cools the coolant to approximately 32 degrees Fahrenheit. The coolant then passes through tubes on the condenser, 115. Vapors are fed into the shell of the condenser unit from the flash distillation drum. In one embodiment these vapors are drawn into the condenser by a pump which creates a vacuum, sucking the vapors into the condenser.

The vapors in the condenser are allowed to condense into a 100 barrel collection tank, 117, which in one embodiment has a temperature of between 80 and 150 degrees Fahrenheit with a pressure at 5-18 PSI. In another embodiment the temperature in the collection tank is 130 degrees Fahrenheit and the pressure is 10 PSI. In one embodiment the collection tank is located underneath the condenser and thus is gravity-fed. The cooled condensate is stored in the collection tank until being pumped into the finished condensate tank, 119, via a pump, 118. In one embodiment the pump, 118 can move between approximately 5 and 40 gallons per minute of condensate, and in another embodiment moves approximately 25 gallons per minute. The final product is condensate with an API of greater than 50. This condensate is stored in the finished condensate tank, 119, for sale or future use. One possible use for this condensate could be in a mix tank for a process of extracting bitumen from oil sands material. In one embodiment the finished condensate tank, 119, has a capacity of approximately 400 barrels, in another embodiment the capacity is approximately 350 barrels, but other capacities can be used, as will be appreciated by those skilled in the art.

In one embodiment, vapors are also collected throughout the process from the condensate tank, the collection tank, and the batch tank, via a system of tubing, and can be fed into a second condenser, 120, to be used in another process or added to the final product.

In view of the foregoing, it will be appreciated that the present disclosure provides an improved method for separating hydrocarbon condensate over approximately 50 API from bitumen. The method separates bitumen and condensate, improving the API of the condensate. As will be appreciated by those of ordinary skill in the art, the present illustrative method improves the separation of high API hydrocarbons from bitumen by more effectively separating the bitumen and the condensate.

In the foregoing detailed description, various features of the present disclosure are grouped together in single embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of any single foregoing disclosed embodiment. Thus, the following claims are hereby incorporated into this detailed description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in quantities, proportions, materials, and manner of making and use may be made without departing from the principles and concepts set forth herein.

What is claimed is:

1. A system for recycling condensate that is used to extract bitumen from oil sands material, the system comprising:
    a batch tank that holds a mixture of bitumen and condensate, the mixture of bitumen and condensate being produced by a process of extracting the bitumen from oil sands material;
    a flash distillation drum;
    a pump that is coupled between the batch tank and the flash distillation drum, the pump causing the mixture of bitumen and condensate to flow from the batch tank towards the flash distillation drum;
    an oil heater that is coupled between the batch tank and the flash distillation drum, the oil heater causing the mixture of bitumen and condensate to be heated as the mixture of bitumen and condensate flows from the batch tank to the flash distillation drum; and
    a throttle valve that is positioned at an inlet of the flash distillation drum and that incorporates one or more nozzles that spray the mixture of bitumen and condensate into the flash distillation drum, the throttle valve causing a pressure of the mixture of bitumen and condensate to drop as the mixture of bitumen and condensate flows through the throttle valve and is sprayed into the flash distillation drum to thereby vaporize the condensate to separate the condensate from the bitumen.

2. The system of claim 1, wherein the oil heater causes the mixture of the bitumen and condensate to be heated to increase the pressure of the mixture of bitumen and condensate to a first pressure.

3. The system of claim 2, wherein the first pressure is between 145-160 PSI.

4. The system of claim 3, wherein the throttle valve causes the pressure of the mixture of bitumen and condensate to drop to between 10 and 20 PSI.

5. The system of claim 2, further comprising:
    one or more sensors or flow regulators that cause the pressure of the mixture of bitumen and condensate to be maintained at the first pressure as the mixture of bitumen and condensate flows towards the throttle valve.

6. The system of claim 1, further comprising:
    a condenser unit that is coupled to the flash distillation drum, the condenser unit receiving and cooling the vaporized condensate to cause the vaporized condensate to condense.

7. The system of claim 6, wherein the condenser unit comprises a shell surrounded by a series of tubes through which coolant is pumped.

8. The system of claim 6, further comprising:
    a vacuum pump that pulls the vaporized condensate from the flash distillation drum into the condenser unit.

9. The system of claim 6, further comprising:
a collection tank that collects the condensate after the condensate has been condensed in the condenser unit.

10. The system of claim 9, wherein the collection tank is positioned below the condenser unit.

11. The system of claim 9, further comprising:
a finished condensate tank that is coupled to the collection tank, the finished condensate tank storing the condensate for subsequent use in the process of extracting bitumen from oil sands material.

12. The system of claim 6, further comprising:
a filter positioned between the flash distillation unit and the condenser unit, the filter allowing the vaporized condensate to flow into the flash distillation unit while blocking the flow of bitumen.

13. The system of claim 1, further comprising:
a bitumen storage tank that is coupled to the flash distillation drum, the bitumen storage tank receiving the bitumen after the condensate has been vaporized to separate the condensate from the bitumen.

14. The system of claim 13, further comprising:
a pre-heat exchanger positioned between the batch tank and the flash distillation drum;
wherein the bitumen storage tank is coupled to the flash distillation drum via tubes that pass through the pre-heat exchanger such that the bitumen passing from the flash distillation drum to the bitumen storage tank is heated by the mixture of bitumen and condensate flowing between the batch tank and the flash distillation drum.

15. The system of claim 1, wherein the batch tank and the oil heater are coupled via a plurality of lines which allow the mixture of the bitumen and condensate to be passed through the oil heater multiple times.

16. A method for recycling condensate that is used to extract bitumen from oil sands material, the method comprising:
collecting, in a batch tank, a mixture of bitumen and condensate that is produced by a process of extracting the bitumen from oil sands material;
causing the mixture of bitumen and condensate to flow from the batch tank towards a flash distillation drum;
heating the mixture of bitumen and condensate as the mixture of bitumen and condensate flows from the batch tank to the flash distillation drum;
passing the mixture of bitumen and condensate through a throttle valve that is positioned at an inlet of the flash distillation drum and that incorporates one or more nozzles to thereby drop the pressure of the mixture of bitumen and condensate as the mixture of bitumen and condensate is sprayed into the flash distillation drum to thereby vaporize the condensate to separate the condensate from the bitumen; and
using the condensate in the process of extracting bitumen from oil sands material after the condensate has been separated from the bitumen.

17. The method of claim 16, wherein the mixture of the bitumen and condensate is heated to increase the pressure of the mixture of bitumen and condensate to a first pressure.

18. The method of claim 17, wherein the first pressure is between 145-160 PSI.

19. The method of claim 18, wherein the pressure of the mixture of bitumen and condensate is dropped to between 10-20 PSI.

20. The method of claim 16, further comprising:
cooling the vaporized condensate to cause the vaporized condensate to condense.

21. The method of claim 20, further comprising:
collecting the condensate after the condensate has been condensed.

22. The method of claim 21, further comprising:
using the collected condensate in the process of extracting bitumen from oil sands material.

23. The method of claim 16, further comprising:
storing the bitumen after the condensate has been separated from the bitumen.

24. The method of claim 23, further comprising:
prior to storing the bitumen but after the condensate has been separated from the bitumen, heating the bitumen.

* * * * *